United States Patent [19]

Sasaki et al.

[11] 4,455,185
[45] Jun. 19, 1984

[54] METHOD OF MANUFACTURING LIQUID CRYSTAL DISPLAY ELEMENT

[75] Inventors: Ken Sasaki; Sigeru Matsuyama; Tsunehiro Yoshino, all of Mobara; Katuhiro Miyazaki, Chiba, all of Japan

[73] Assignee: Hitachi, Ltd., Tokyo, Japan

[21] Appl. No.: 415,572

[22] Filed: Sep. 7, 1982

[30] Foreign Application Priority Data

Sep. 9, 1981 [JP] Japan .................. 56-140988

[51] Int. Cl.³ .................. B32B 31/18; G09F 9/00
[52] U.S. Cl. .................. 156/250; 40/448; 156/256; 350/330; 350/343
[58] Field of Search .............. 156/250, 252, 256, 257, 156/268; 40/448; 350/330, 331 R, 336, 343

[56] References Cited

U.S. PATENT DOCUMENTS 3,751,137  8/1973  Fitzgibbons et al. .............. 350/343
4,224,093  9/1980  Kohyama et al. .................. 156/250

FOREIGN PATENT DOCUMENTS 52-22895  2/1977  Japan .................. 40/448
54-28172  3/1979  Japan .................. 350/330
55-4033   1/1980  Japan .................. 350/343
56-72417  6/1981  Japan .................. 350/343

*Primary Examiner*—Caleb Weston
*Attorney, Agent, or Firm*—Charles E. Pfund

[57] ABSTRACT

A method of manufacturing liquid crystal display element by a multi-element process is disclosed. Two substrates of plastic film provided with electrodes in individual element sections are put together such that the electrodes on these plastic films are in register with one another, liquid crystal is sealed in a space between the substrates which is defined in respect of the individual element sections by a seal member in the form of a closed configuration and the substrates are cut to obtain individual liquid crystal display elements separated from one another. One of the substrates is formed with cuts in the neighborhood of the outer wall of the seal members before putting together the substrates.

8 Claims, 9 Drawing Figures

METHOD OF MANUFACTURING LIQUID CRYSTAL DISPLAY ELEMENT

BACKGROUND OF THE INVENTION

This invention relates to a method of manufacturing liquid crystal display elements and, more particularly, to a multi-element manufacturing process wherein a pair of plastic film substrates are prepared, a number of liquid crystal display cells are formed simultaneously between the substrates, and a liquid crystal material is filled in the cells and sealed.

It has already been known to use a plastic substrate as an electrode substrate of a liquid crystal display element in place of a glass substrate. The plastic substrate has possibility of its reduction in thickness and manufacture cost when compared to the glass substrate. In using the glass substrate as the electrode substrate of the liquid crystal display element, its thickness can only be about 0.2 mm at the thinnest for ease of handling whereas thickness reduction of the plastic film to below 0.2 mm is possible. For these reasons, substitution of plastic for glass for use in the substrate of liquid crystal display element has been studied.

In the manufacture of liquid crystal display element, a process of producing a single element one after another is difficient in view of economy. To obviate this drawback, a multi-element manufacturing process for simultaneous formation of a number of liquid crystal display cells between the glass substrates has been employed. In this process, the substrates are cut to divide a number of liquid crystal display elements thus formed into individual elements after or before the filling of the liquid crystal material. The process to cut the glass substrates is "scribing" wherein the glass substrates are first scribed by means of a sintered carbide or diamond cutter and then applied with force for separation.

This method of scribing, however, cannot be applied to the substrates of plastic film which not rigid unlike glass. For cutting the plastic film substrates, press dies with cutting blades may be used, but this cutting method is practically almost ineffective for cutting upper and lower substrates of large area which are put together with about 10 μm distance therebetween.

SUMMARY OF THE INVENTION

The invention has as its object to overcome the above problems, and provide a method of manufacturing liquid crystal display elements wherein a number of liquid crystal display elements each having upper and lower plastic substrates of different areas can be readily produced through the multi-element manufacturing process.

According to the invention, this object is achieved by forming cuts to penetrate in the direction of thickness in at least one of the two plastic film substrates in the neighborhood of the outer wall of a seal member for each element before putting together the substrates.

DESCRIPTION OF PREFERRED EMBODIMENTS

Figure 1:
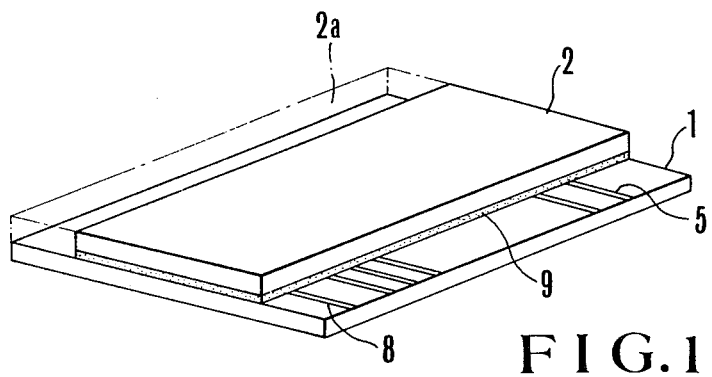
FIG. 1 is a perspective view showing a liquid crystal display element produced by the method according to the invention.
Figure 2:
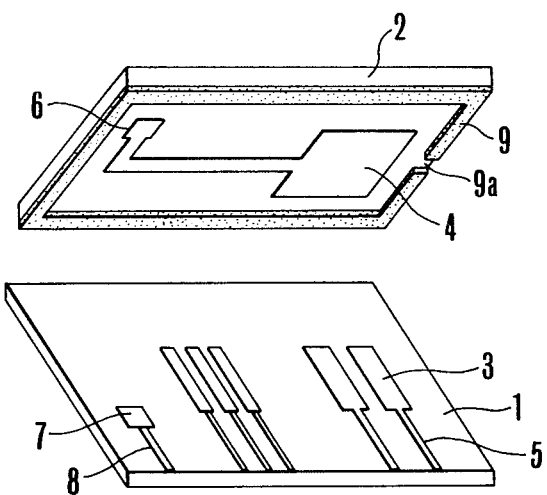
FIG. 2 is an exploded perspective view of the same liquid crystal display element.

Before describing the multi-element manufacturing process according to the invention, a complete liquid crystal display element which is manufactured by this process will first be described. As shown in FIGS. 1 and 2, the liquid crystal display element comprises plastic film substrates 1 and 2, segment electrodes, upper and lower connector sections 6 and 7 and a seal member 9. The seal member 9 is formed with a liquid crystal inlet 9a.

As is seen from the Figures, the two opposed substrates 1 and 2 have different areas, so that an exposed electrode lead section is formed by a portion of the substrate not overlapping the substrate 2. In the multi-element manufacturing process, therefore, the substrates 1 and 2 have to be cut differently to separate the individual elements. In the illustrated example of the liquid crystal display element, a portion of the substrate 1 is also exposed on the side opposite to the exposed electrode lead section. However, since there are no electrode leads on the section on the opposite side, the substrate 2 may extend to add to a portion 2a covering the substrate 1 as shown by phantom lines in FIG. 1. This can be true in case of further embodiments described later in connection with FIGS. 7 and 8.

Now, the multi-element manufacturing process according to the invention for producing the liquid crystal display element as described above will be described.

Figure 3:
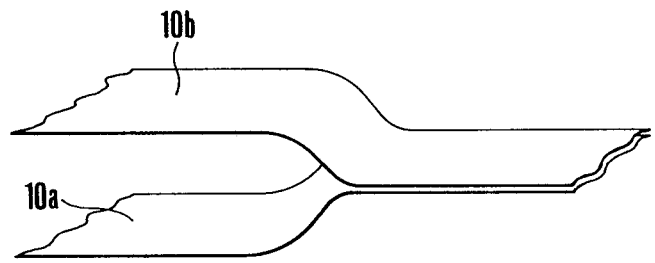
FIG. 3 is a fragmentary perspective view showing a pair of plastic film substrates to be put together.

Referring to FIG. 3, two substrates 10a and 10b, which have been provided with electrodes, orientation surfaces and seal members for individual liquid crystal display elements, are put together by pressing them against each other by means of rollers (not shown). Then, the seal members are hardened.

Figure 4:
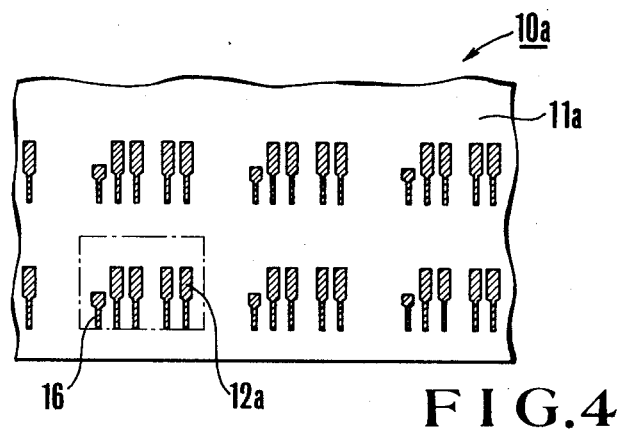
FIG. 4 is a fragmentary plan view showing one plastic film substrate with segment electrodes for individual elements formed on it.
Figure 5:
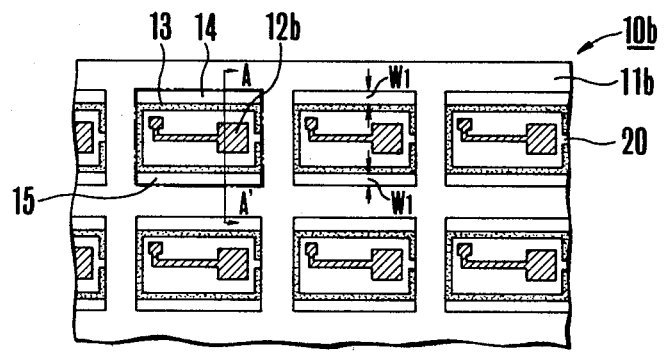
FIG. 5 is a fragmentary plan view showing the other plastic film substrate with common electrodes and seal members provided for individual elements.

FIG. 4 shows one substrate 10a. It comprises a plastic film 11a and segment electrode 12a formed on the surface of the plastic film 11a. Although not shown, the surface of the segment electrodes is provided with a well-known orientation surface. FIG. 5 shows the other substrate 10b. It comprises a plastic film 11b, common electrodes 12b formed thereon and seal members 13 of a closed configuration (rectangular) formed thereon to surround the respective common electrodes. Although not shown, the surface of the common electrode is provided with a well-known orientation surface. The film 11b is formed, in the neighborhood of the two parallel long outer side walls of each seal member 13, with cuts 14 and 15 which are in the illustrated embodiment rectangular windows with a width of W1, by means of press stamping. The width W1 corresponds to the length of the exposed electrode leads (projecting from the seal member 9). The window 15, which need not expose any electrode lead, may be omitted as mentioned earlier.

The segment elctrodes 12a and common electrodes 12b may be formed by forming transparent conductive films on the surfaces of the respective plastic films 11a and 11b and selectively etching them to desired shapes by the well-known photoetching process. Further, although not shown, the orientation surface may be obtained by forming an orientation film of a material capable of a low temperature such as PVA on the surface where the electrodes have been formed and then rubbing the orientation film.

In FIGS. 4 and 5, a block enclosed within a phantom line rectangle corresponds to one liquid crystal display element. Each cut 14 formed in the substrate 10b corresponds to a portion of the substrate 10a which leads 16 will be exposed. When the substrates 10a and 10b are put together with each pair of sections constituting one display element being in accurate register with each other, the segment electrodes 12a in one element are in accurate register with the common electrode 12b in that element, and each cut 14 is in register with the portion where the corresponding portion where leads 16 are exposed. To obtain accurate register of the two substrates 10a and 10b, it is effective to synchronize the feed of the two substrates using, for instance, sprockets.

Figure 6:
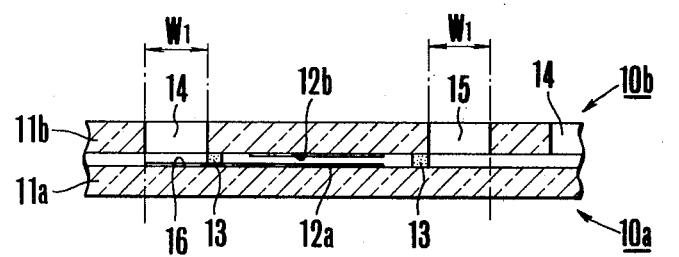
FIG. 6 is a fragmentary sectional view to an enlarged scale taken along line A-A' in FIG. 5, showing the substrates of FIGS. 4 and 5 after they have been put together.

The substrates 10a and 10b are put together in register, and the seal members 13 are hardened by pressing the mated substrates by means of rollers. FIG. 6 shows one element defined by the mated substrates 10a and 10b in sectional form taken along line A-A' in FIG. 5. Portions of the substrate 10a corresponding to the windows 14 and 15 are exposed when viewed from above the substrate 10b.

Liquid crystal is subsequently poured into space between the substrate 10a and 10b enclosed by each seal member 13 through the liquid crystal inlet 20 and then sealed. Subsequently, the substrates are cut along the phantom lines shown in FIGS. 4, 5 and 6 to separate the individual liquid crystal display elements. In the above way, liquid crystal display elements can be produced on a mass production basis. Since the substrate 10b has been previously formed with cuts 14 and 15 so that the corresponding portions of the substrate 10a be exposed, only the substrate 10a is required to be cut by means of, for example, press dies with cutter blades and the possibility of damaging the leads 16 can be eliminated.

In the above embodiment, since the cuts 15 are also formed, if each element has a large number of leads, some leads may of course be provided on the side of the cut 15 as well.

Further, while in the above embodiment the windows in the substrate 10b are formed by press stamping it is also possible to form the window using a cutter.

Further, while in the above embodiment the seal member 13 which is printed and has a frame-like shape has been used to seal the substrates for defining contour of each liquid crystal display element, it is also possible to seal the substrates by thermal fusion except for a portion of the contour through which the leads 16 are led out. In this case, a printing pattern of different frames for different sizes of liquid crystal display elements can be dispensed with, and a seal material can be applied only by coating it in one direction using a dispenser. Thus, liquid crystal display elements having different dimensions can be formed easily on a mass production basis using the same apparatus.

Figure 9:
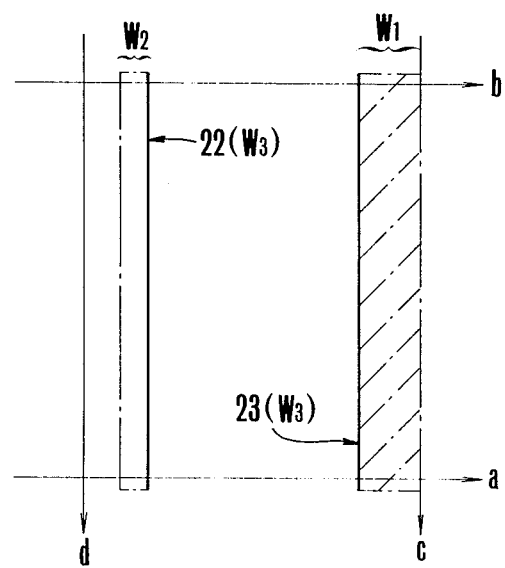
FIG. 9 is a schematic plan view showing the relation between cutting lines and cuts applied to the substrate.

In the above embodiment, the windows that have the width W1 substantially equal to the length of the exposed portions of leads in the element have been formed as the cuts. However, the width of the cuts are not limited to W1. For example, it is possible to form a cut having a width W2 (<W1) from the outer wall of the seal member as shown in FIG. 9. As a further alternative, it is possible to form cuts 22 and 23 which correspond to geometrical line segments (W3$\approx$0) along the outer walls of the seal member. This is because when cutting the substrate along lines a, b, c and d to separate the individual elements, a portion cross-hatched by phantom lines can be removed by the aid of not only the windows of widths of W1 and W2 but also the cutting line 22 and 23. This fact can give redundancy in the design of the press stamping dies.

Figure 7:
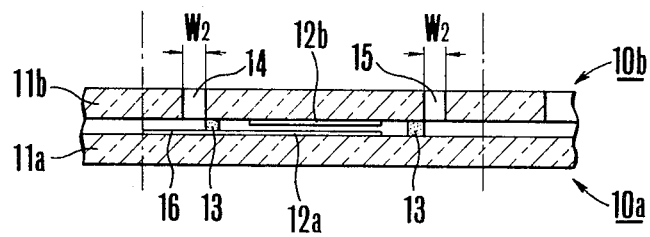
FIG. 7 is a fragmentary sectional view similar to FIG. 6 but showing a different embodiment of the invention.
Figure 8:
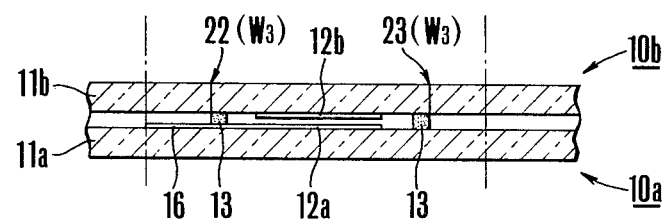
FIG. 8 is a fragmentary sectional view similar to FIG. 6 but showing a further embodiment of the invention.

FIG. 7 and 8 show different embodiments which are given in the above view point. In the Figures, the same parts as those in FIG. 6 are designated by like reference numerals or symbols.

As has been described in the foregoing, by forming a window or cutting line on a portion of one of the substrates for each liquid crystal display element, in the cutting step after the substrates have been put together, the individual elements each having exposed lead portions can be directly obtained. Thus, if the removed portion of one of the substrates is set in accurate register with the portion of the other substrate where the leads are exposed, liquid crystal display elements each having upper and lower substrates having different areas can be readily produced on a mass production basis using plastic film substrates without the possibility of damaging the exposed lead portions.

What is claimed is:

1. A method of manufacturing liquid crystal display elements by a multi-element manufacturing process comprising the steps of putting together two substrates of plastic film provided with electrodes in individual element sections such that the electrodes on these plastic films are in register with one another, sealing liquid crystal in a space between the substrates which is defined in respect of the individual element sections by seal members in the form of a closed configuration, and cutting said substrates to obtain individual liquid crystal display elements separated from one another, wherein one of said substrates is formed with cuts which penetrate the substrate through its thickness in the neighborhood of the outer wall of said seal members before bringing said substrates together for bonding.

2. The method according to claim 1, wherein said two substrates are put together by feeding said substrates in synchronism to one another.

3. The method according to claim 1, wherein said cuts form windows having a predetermined width from the outer wall of said respective seal members.

4. The method according to claim 3, wherein said predetermined width is substantially equal to the length of exposed electrode lead portions.

5. The method according to claim 3, wherein said predetermined width is less than the length of exposed electrode lead portions.

6. The method according to claim 1, wherein said cuts are cutting lines extending along the outer wall of said respective seal members.

7. The method according to claim 1, wherein said seal members are each rectangular in shape, and said cuts are each formed on the outer side of the outer wall of the side of each said seal member where exposed electrode lead portions are found on the other said substrate.

8. The method according to claim 1, wherein said seal members are each rectangular in shape, and said cits are each formed on the outer side of the outer walls of the side of each said seal member where exposed electrode lead portions are found on the other said substrate and also on the opposite periphery outer side of each said seal member.

* * * * *